(12) United States Patent
Kutliroff

(10) Patent No.: US 10,482,681 B2
(45) Date of Patent: Nov. 19, 2019

(54) RECOGNITION-BASED OBJECT SEGMENTATION OF A 3-DIMENSIONAL IMAGE

(71) Applicant: INTEL CORPORATION, Santa Clara, CA (US)

(72) Inventor: Gershom Kutliroff, Alon Shvut (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/019,011

(22) Filed: Feb. 9, 2016

(65) Prior Publication Data

US 2017/0228940 A1   Aug. 10, 2017

(51) Int. Cl.
*G06K 9/00* (2006.01)
*G06T 19/20* (2011.01)
*G06T 7/12* (2017.01)

(52) U.S. Cl.
CPC .......... *G06T 19/20* (2013.01); *G06K 9/00624* (2013.01); *G06T 7/12* (2017.01); *G06T 2207/10028* (2013.01); *G06T 2219/2008* (2013.01)

(58) Field of Classification Search
CPC ... G06T 19/20; G06T 7/0075; G06T 2200/04; G06T 7/593; G06T 7/66; G06T 2210/12; G06T 2219/2008; G06T 2207/10028; G06T 7/12; G06T 2207/1008; H04N 2013/0077; G06K 9/52; G06K 9/00208; G06K 9/46; G06K 9/4604; G06K 9/00624

See application file for complete search history.

(56) References Cited

U.S. PATENT DOCUMENTS

| 8,488,877 | B1 | 7/2013 | Owechko et al. |
| 8,571,328 | B2 | 10/2013 | Shechtman et al. |
| 8,849,039 | B2 | 9/2014 | Pham et al. |
| 8,861,840 | B2 | 10/2014 | Bell et al. |
| 8,942,917 | B2 | 1/2015 | Chrysanthakopoulos |
| 9,083,960 | B2 | 7/2015 | Wagner et al. |
| 9,158,971 | B2 | 10/2015 | Gaidon et al. |

(Continued)

OTHER PUBLICATIONS

International Search Report International Patent Application No. PCT/US2017/012543, mailed Apr. 20, 2017, 5 pages.

(Continued)

*Primary Examiner* — Yon J Couso
(74) *Attorney, Agent, or Firm* — Finch & Maloney PLLC

(57) ABSTRACT

Techniques are provided for segmentation of objects in a 3D image of a scene. An example method may include receiving, 3D image frames of a scene. Each of the frames is associated with a pose of a depth camera that generated the 3D image frames. The method may also include detecting the objects in each of the frames based on object recognition; associating a label with the detected object; calculating a 2D bounding box around the object; and calculating a 3D location of the center of the bounding box. The method may further include matching the detected object to an existing object boundary set, created from a previously received image frame, based on the label and the location of the center of the bounding box, or, if the match fails, creating a new object boundary set associated with the detected object.

25 Claims, 11 Drawing Sheets (5 of 11 Drawing Sheet(s) Filed in Color)

(56) References Cited

U.S. PATENT DOCUMENTS

| | | |
|---|---|---|
| 9,171,403 B2 | 10/2015 | Shapira et al. |
| 9,201,499 B1 | 12/2015 | Chang |
| 9,378,431 B2 | 6/2016 | Stoeffler et al. |
| 9,436,987 B2 | 9/2016 | Ding et al. |
| 9,438,891 B2 | 9/2016 | Mannion et al. |
| 9,525,862 B2 | 12/2016 | Benhimane et al. |
| 9,626,737 B2 | 4/2017 | Frushour et al. |
| 9,639,943 B1 | 5/2017 | Kutliroff et al. |
| 9,665,937 B2 | 5/2017 | Luo |
| 9,669,380 B2 | 7/2017 | Somanath |
| 9,699,380 B2 | 7/2017 | Somanath et al. |
| 9,779,508 B2 | 10/2017 | Pradeep et al. |
| 2007/0031064 A1 | 2/2007 | Zhao |
| 2008/0225044 A1 | 9/2008 | Huang et al. |
| 2009/0128577 A1 | 5/2009 | Gloudemans |
| 2009/0232355 A1 | 9/2009 | Minear et al. |
| 2009/0232388 A1 | 9/2009 | Minear et al. |
| 2010/0079456 A1 | 4/2010 | Barth |
| 2010/0207936 A1 | 8/2010 | Minear et al. |
| 2010/0289817 A1 | 11/2010 | Meier |
| 2011/0116698 A1 | 5/2011 | Weis |
| 2011/0194732 A1 | 8/2011 | Tsuji |
| 2012/0194644 A1 | 8/2012 | Newcombe et al. |
| 2012/0195471 A1 | 8/2012 | Newcombe |
| 2012/0306876 A1 | 12/2012 | Shotton |
| 2013/0170696 A1 | 7/2013 | Zhu et al. |
| 2013/0181983 A1 | 7/2013 | Kitamura et al. |
| 2014/0003705 A1 | 1/2014 | Taguchi et al. |
| 2014/0037189 A1 | 2/2014 | Ziegler; et al. |
| 2014/0105486 A1 | 4/2014 | Tamaazousti |
| 2014/0206443 A1 | 7/2014 | Sharp |
| 2014/0340489 A1 | 11/2014 | Medioni |
| 2015/0006117 A1 | 1/2015 | Zhang et al. |
| 2015/0030236 A1 | 1/2015 | Wilson et al. |
| 2015/0231490 A1 | 8/2015 | Graepel |
| 2015/0262412 A1 | 9/2015 | Gruber |
| 2015/0347872 A1 | 12/2015 | Taylor et al. |
| 2016/0012646 A1 | 1/2016 | Huang et al. |
| 2016/0171755 A1 | 6/2016 | Karsch |
| 2016/0189381 A1 | 6/2016 | Rhoads |
| 2016/0189419 A1 | 6/2016 | Fakih et al. |
| 2016/0196659 A1* | 7/2016 | Vrcelj .................. G06K 9/34 382/154 |
| 2016/0328856 A1* | 11/2016 | Mannino ................ G06T 7/73 |
| 2016/0343152 A1* | 11/2016 | Hay .................. G06T 7/337 |
| 2017/0046868 A1 | 2/2017 | Chernov et al. |
| 2017/0084025 A1 | 3/2017 | Lyu |
| 2017/0243352 A1 | 8/2017 | Kutliroff et al. |
| 2017/0278231 A1 | 9/2017 | Narasimha |
| 2017/0341237 A1 | 11/2017 | Jain et al. |
| 2017/0345181 A1 | 11/2017 | Yu et al. |
| 2017/0372489 A1 | 12/2017 | Tabuchi et al. |
| 2018/0005015 A1 | 1/2018 | Hou et al. |

OTHER PUBLICATIONS

International Search Report International Patent Application No. PCT/US2017/013353, mailed Apr. 27, 2017, 5 pages.

Girshick, R. et al., "Rich feature hierarchies for accurate object detection and semantic segmentation", IEEE Conference on Computer Vision and Pattern Recognition (CVPR), 2014, 8 pages.

Krizhevsky, A. et al., "Imagenet Classification with Deep Convolutional Neural Networks", Advances in Neural Information Processing Systems 25 Conference, 2012, 9 pages.

Breen, et al., "Interactive Occlusion and Automatic Object Placement for Augmented Reality", Computer Graphics Forum, 1996, vol. 15, 12 pages.

Mian, et al., "Three-dimensional model-based object recognition and segmentation in cluttered scenes", IEEE Transactions on pattern analysis and machine intelligence, Oct. 2006, vol. 28, 18 pages.

Non Final Rejection received in U.S. Appl. No. 15/046,614 (dated Jun. 12, 2017) (16 pages).

Song, S. et al., "Robot in a room: toward perfect object recognition in closed environment", Jul. 2015, 10 pages.

Grigorescu, S. et al., "Robust feature extraction for 3D reconstruction of boundary segmented objects in a robotic library scenario", IEEE RSJ International Conference on Intelligent Robots and Systems, Oct. 2010, 8 pages.

Notice of Allowance in related U.S. Appl. No. 15/046,614 (dated Jan. 4, 2018).

Final Rejection received in U.S. Appl. No. 15/209,014 (dated Aug. 15, 2018) (13 pages).

Written Opinion of the International Searching Authority for International Patent Application PCT/US2017/013353, dated Apr. 27, 2017, 8 pages.

Written Opinion of the International Searching Authority for International Patent Application PCT/US2017/012543, dated Apr. 20, 2017, 7 pages.

Non Final Rejection received in U.S. Appl. No. 15/209,014 (dated Mar. 5, 2018) (10 pages).

* cited by examiner

RGB Image Frame
202

Depth Map Frame
204

RECOGNITION-BASED OBJECT SEGMENTATION OF A 3-DIMENSIONAL IMAGE

BACKGROUND

There are many applications for which it may be desired to segment out one or more objects from a 3-Dimensional (3D) image of a scene. For example, a preliminary operation in many computer vision-based tasks is to segment out some particular object of interest, for subsequent analysis, from the scene in which the object appears. Another example application requiring 3D segmentation is box measurement. A 3D image from a depth camera provides the distance between the camera and objects within the scene, which can be used to obtain measurements of the surface area or the volume of objects, such as boxes or cartons. It is first necessary, however, to perform a 3D segmentation of the object of interest, to ensure that the sampled points used to calculate the dimensions of the object do not belong to the surrounding environment. Yet another example application for 3D segmentation lies in the field of robotics, and more specifically, the problem of navigating a robot through an arbitrary environment. Generally, the robot must perform various calculations to understand the geometry of the scene, which allows it to make certain decisions. For example, the robot must be able to estimate the distance between two adjacent objects in its path, to decide if it will be possible to pass between the objects. The segmentation problem is generally considered to be difficult and existing techniques suffer from a variety of limitations and problems, particularly when objects are composed of multiple parts with varying geometries or when the objects include different materials and textures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of embodiments of the claimed subject matter will become apparent as the following Detailed Description proceeds, and upon reference to the Drawings, wherein like numerals depict like parts.

Although the following Detailed Description will proceed with reference being made to illustrative embodiments, many alternatives, modifications, and variations thereof will be apparent to those skilled in the art.

DETAILED DESCRIPTION

Generally, this disclosure provides techniques for segmentation of objects of interest in a 3D image of a scene. Unlike conventional segmentation systems, the present disclosure implements a top-down approach that includes the initial detection of an object in 3 dimensions and the subsequent removal of elements of the scene which are not part of the detected object. With the object so detected and isolated, a set of object boundary points in 3D space can then be identified that specify the borders of the entire object.

In accordance with an embodiment, a depth camera captures multiple images of a scene from varying perspectives. The scene includes a plurality of objects. Object recognition techniques are employed to detect and label objects in each image and a 2D bounding box is generated to contain each object in each image. An attempt is made to match the object to an existing object boundary set of 3D pixels. However, if no match can be found, a new object boundary set is created which contains 3D projections of pixels contained in the 2D bounding box. The 3D pixels in the object boundary set are also paired with a vector that describes the perspective of the camera associated with the capture of that pixel. Refinement of the object boundary sets may be performed to eliminate pixel duplication and to address the problem of occluding objects, based on the positions of the pixels and on the associated camera perspective vectors, as will be explained in greater detail below. Additionally, pixels associated with surface planes, upon which the objects may be resting, are also removed from the object boundary sets as a further refinement.

The techniques described herein for 3D object segmentation may provide a number of improvements over conventional techniques, which simply attempt to group together similar pixels or rely on assumed object geometries, and may therefore handle more complex object shapes and varying textures with greater effectiveness, according to some embodiments. The segmentation techniques can be implemented in hardware or software or a combination thereof, and may be adapted into any number of applications where 3D segmentation of objects from a scene is desired.

Figure 1:
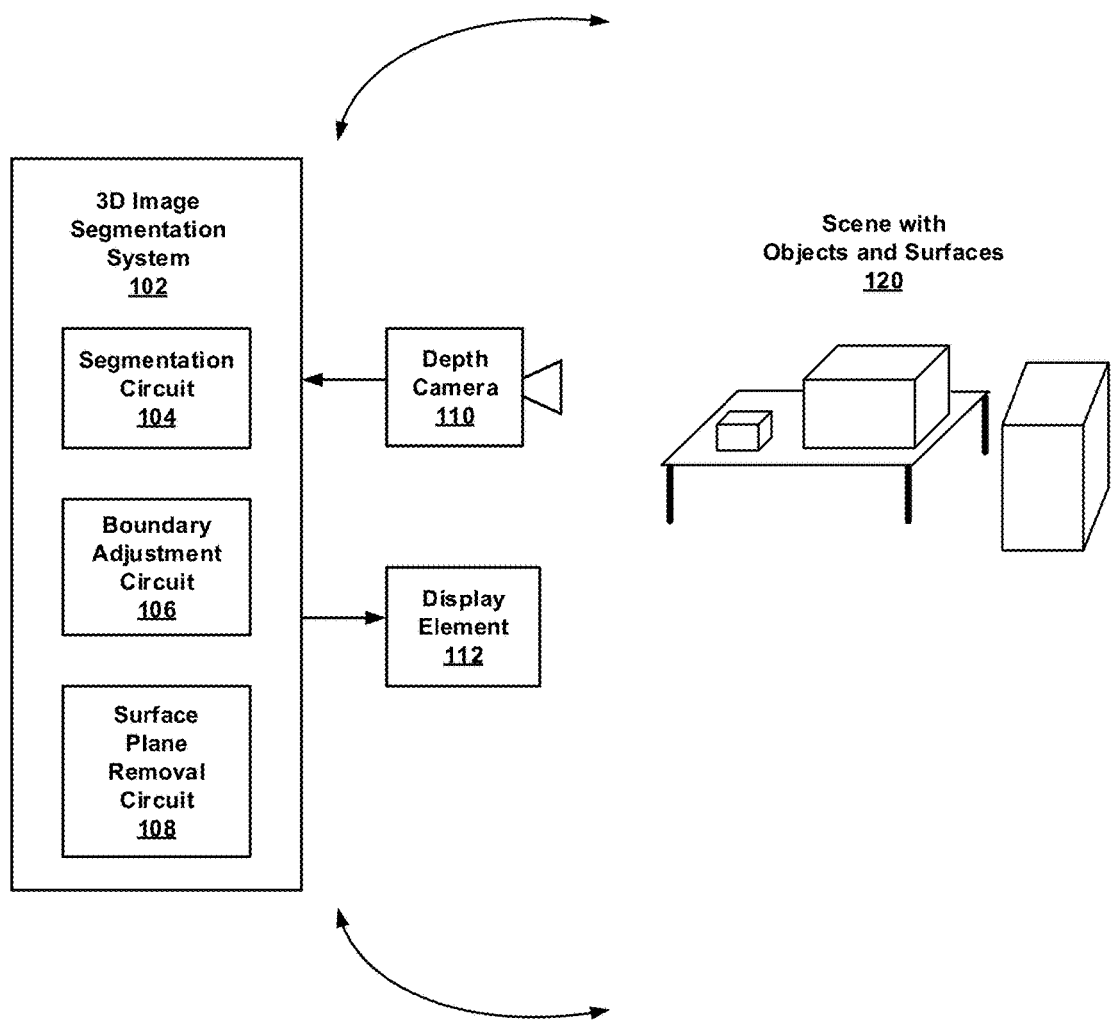
FIG. 1 is a top level block diagram of a system for 3-Dimensional (3D) image segmentation, in accordance with certain of the embodiments disclosed herein.

FIG. 1 is a top level block diagram 100 of a system for 3-Dimensional (3D) image segmentation, in accordance with certain of the embodiments disclosed herein. A 3D image segmentation system 102 is shown to include a segmentation circuit 104, a boundary adjustment circuit 106 and a surface plane removal circuit 108. The system 102 may also include, or otherwise couple to, a depth camera 110 and display element 112. The system may be configured as a mobile platform that can be moved with respect to the scene 120 to capture 3D image frames from multiple perspectives or camera poses. Each 3D image frame may comprise a color image frame that provides color (e.g., red, green and blue or RGB) pixels, and a depth map frame that provides depth pixels. The scene 120 may include one or more objects of interest, some of which may be positioned or otherwise resting on surface planes such as tables or shelves.

The segmentation circuit 104 may be configured to generate an initial estimate of 3D boundaries of objects of interest in a scene based on 3D images obtained from a number of poses of a depth camera, as will be explained in greater detail below. The estimated boundaries may be expressed as a set of 3D pixels associated with the boundary. The boundary adjustment circuit 106 may be configured to improve the estimated boundaries by removing duplicate pixels from the boundary sets that result from the processing of image frames obtained from different perspectives of the object. The boundary adjustment circuit 106 may also be configured to remove pixels associated with occluding objects. The surface plane removal circuit 108 may be configured to further improve the estimated boundaries by removing pixels associated with surface planes upon which the objects may be positioned.

Figure 2:
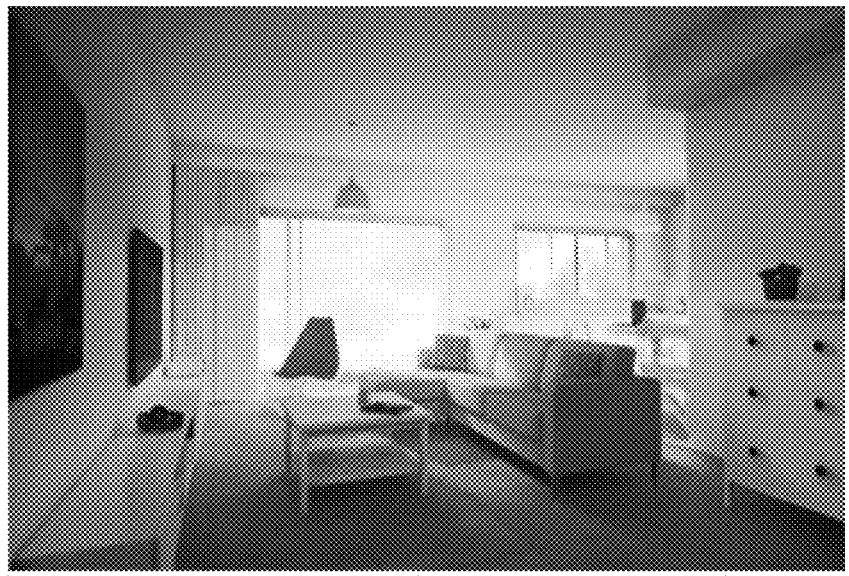
FIG. 2 illustrates an example color image and depth map, in accordance with certain of the embodiments disclosed herein.
Figure 2:
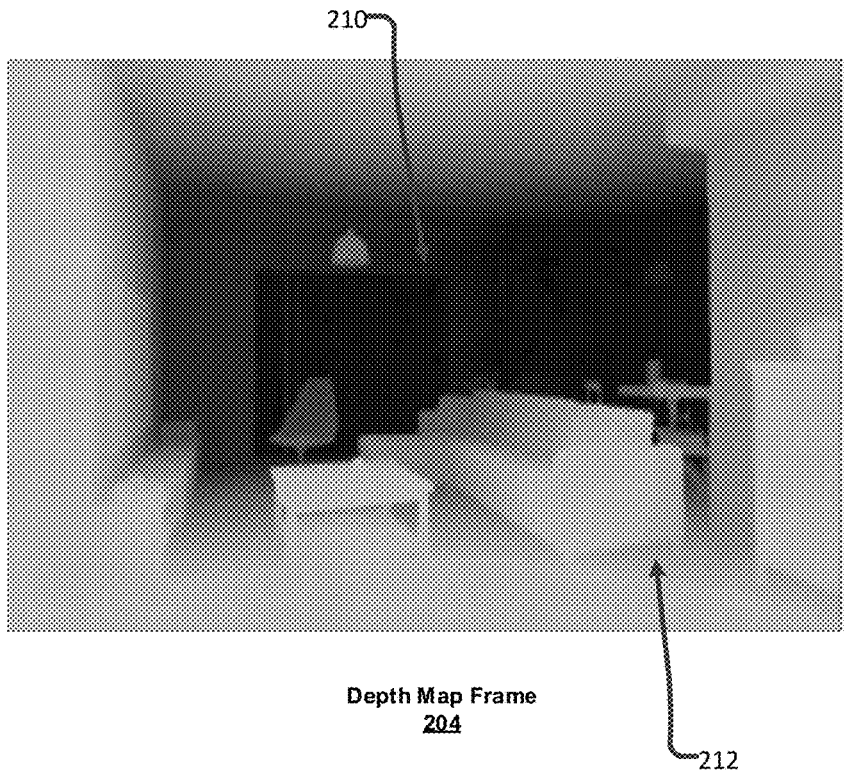

FIG. 2 illustrates an example color image and depth map, in accordance with certain of the embodiments disclosed herein. An RGB image frame 202 is shown alongside a corresponding depth map frame 204 of a scene of a furnished room provided by a depth camera. The scene includes a variety of objects such as a table, lamp, sofa, etc. The RGB frame 202 captures color data represented RGB pixels of the image, although other color schemes are possible. In the depth map frame 204, each pixel represents the distance between that region of the scene and the camera. This can be done through the intensity value of each pixel. In the depth map frame 204, for example, the pixel indicates proximity to the camera. In particular, regions with darker (more intense) pixels 210 are relatively far from the camera, while lighter (less intense) pixels 212 are closer. In addition, the operational parameters of the camera, such as focal length, are known or provided so that each depth pixel can be projected into a 3D position in the scene relative to the camera.

Figure 3:
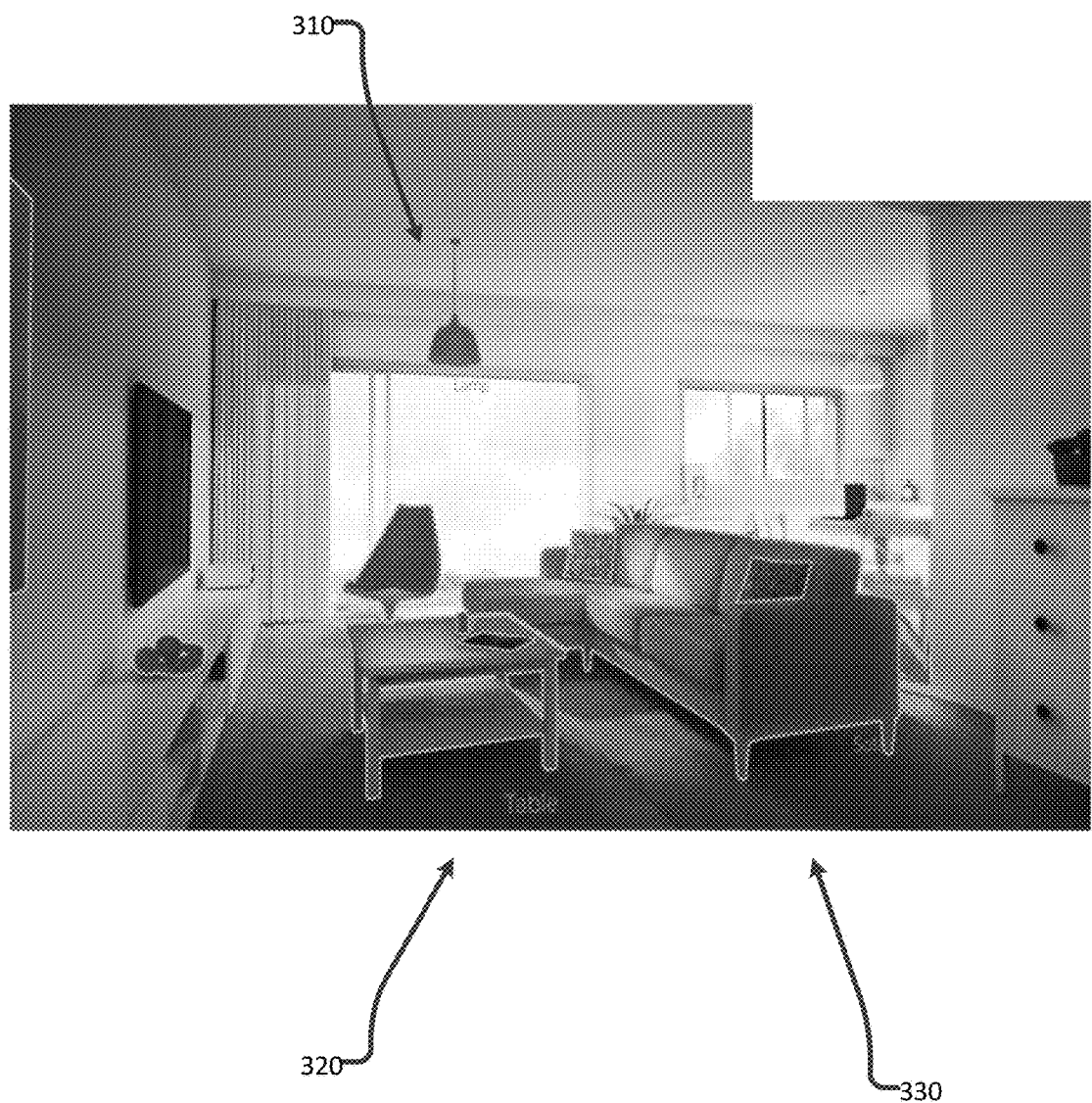
FIG. 3 illustrates an example of segmented objects in a 3D image, in accordance with certain of the embodiments disclosed herein.

FIG. 3 illustrates an example of segmented objects in a 3D image, in accordance with certain of the embodiments disclosed herein. Here, the same furnished room is shown as in FIG. 2, but the detected objects (e.g., lamp 310, table 320, sofa 330, etc.) have been marked with boundaries (in blue) to represent the result of the segmentation process described herein. More specifically, the segmentation process generates, for each object of interest, a collection of 3D points, referred to as an object boundary set, representing the 3D boundary of the object of interest.

Figure 4:
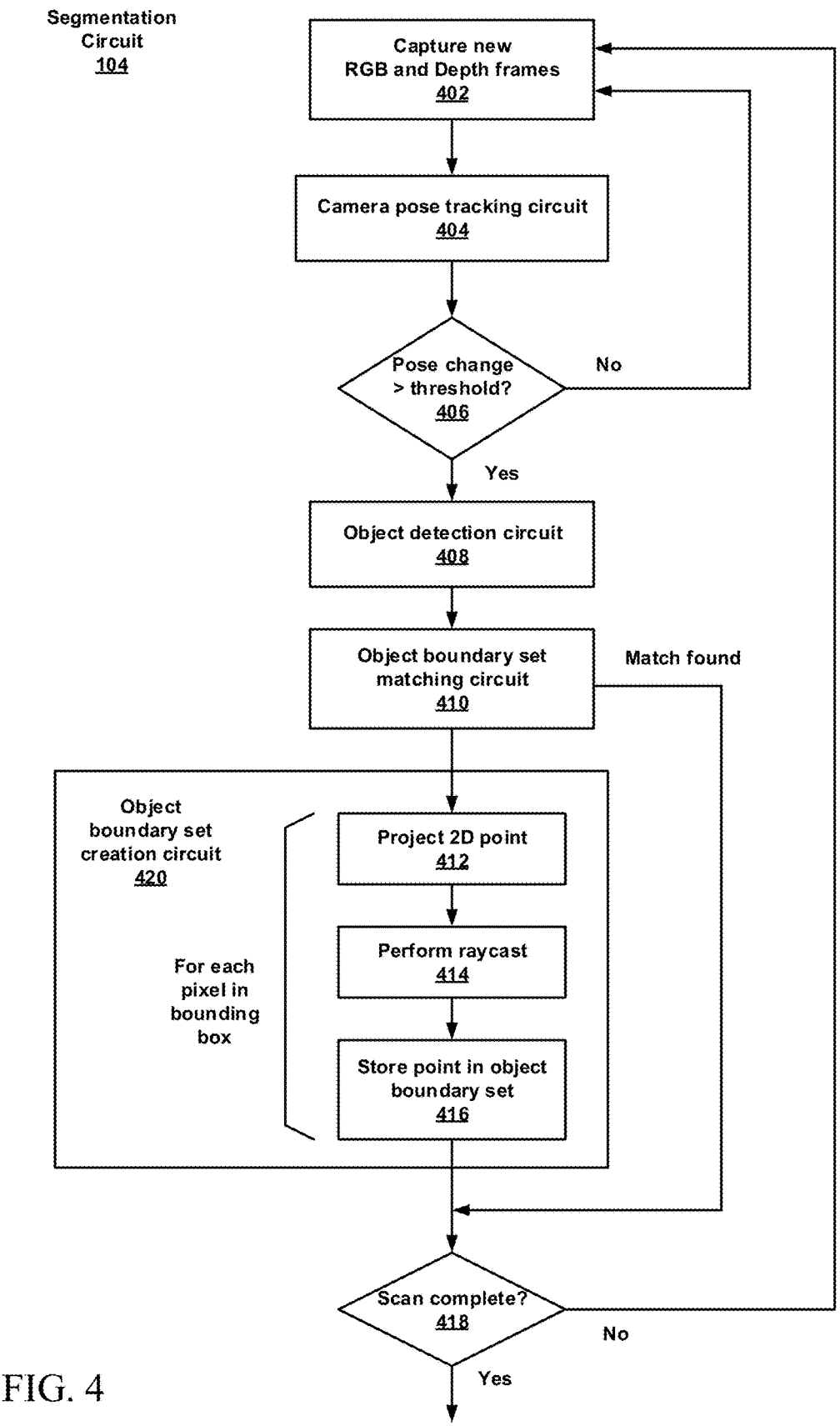
FIG. 4 is a more detailed block diagram of a segmentation circuit, configured in accordance with certain of the embodiments disclosed herein.

FIG. 4 is a more detailed block diagram of a segmentation circuit 104, configured in accordance with certain of the embodiments disclosed herein. The segmentation circuit 104 is shown to include a camera pose tracking circuit 404, an object detection circuit 408, an object boundary set matching circuit 410 and an object boundary set creation circuit 420.

As new RGB and depth frames of the scene 120 are captured by depth camera 110, at operation 402, they are provided to the camera pose tracking circuit 404. The camera pose tracking circuit 404 may be configured to compute and update the position and orientation (or pose) of the camera. The calculated pose of the camera is the 3D transformation from the position and orientation of the camera in a previous frame, to its position and orientation in the current frame. Three parameters may describe the translation of the camera between consecutive frames (e.g., x, y and z). Three additional parameters may describe the change in orientation (e.g., yaw, pitch and roll angle) for a total of six degrees of freedom (6DOF) that are computed to determine the updated pose of the camera relative to its pose in the previous frame. Determination of the camera pose for each frame can be used to establish a global coordinate system, consistent across all captured frames, in which the camera pose as well as 3D points extracted from the depth map can be placed. The calculation of the camera pose may be performed in real-time.

In some embodiments, the camera pose may be calculated using an RGB-based Simultaneous Localization and Mapping (SLAM) algorithm which is configured to extract feature descriptors from each RGB frame, match corresponding features across multiple frames and calculate the 6DOF camera pose for each frame through triangulation. Alternatively, data from inertial sensors, such as gyroscopes and accelerometers, may be used, either independently, or in combination with the results of the RGB SLAM technique to obtain a more robust estimate of the camera pose.

In some embodiments, the calculation of the camera pose may be based on the depth maps. An Iterative Closest Point algorithm (ICP) can be applied to successive depth maps captured by the camera, to align two sets of point clouds and compute the transformation between them. Assuming the two point cloud sets represent static scenes, the computed transformation describes the movement of the camera that captured the two point cloud sets. By computing the camera transformation describing successive point cloud frames, the global camera pose for each frame can be computed, and the associated point clouds can be accumulated into a single data structure representing the 3D reconstruction of the entire scene. Moreover, each point in the scene is sampled multiple times, and consequently, a weighted average of their 3D positions can be computed, generating a higher quality 3D reconstruction of the scene. Furthermore, the segmentation techniques described below, which rely on depth data, may operate directly on the depth maps provided by the camera or on the 3D reconstruction based on aligning successive depth frames and averaging the 3D positions of the accumulated points. In some embodiments, the camera pose may be estimated using other known techniques in light of the present disclosure.

The camera pose tracking circuit determines the 3D position of the camera at each frame, in a global coordinate system. Consequently, 3D points extracted from the associated depth maps can also be transformed to this coordinate system. Thus, computation of the camera pose for each frame allows for integration of the depth maps obtained at different times into a single 3D space. Each camera frame also includes an RGB image, which may similarly be associated with the 6DOF camera pose.

Camera motion, as the scene is scanned, may be relatively slow such that there could be significant overlap between successive RGB images. At operation 406, if the change in camera pose does not exceed a threshold value, processing of the RGB frame may not be justified and the system will wait for a subsequent frame capture. The threshold value may be set based on the processing capabilities of the system and/or the expected speed of the camera scanning motion.

Figure 5:
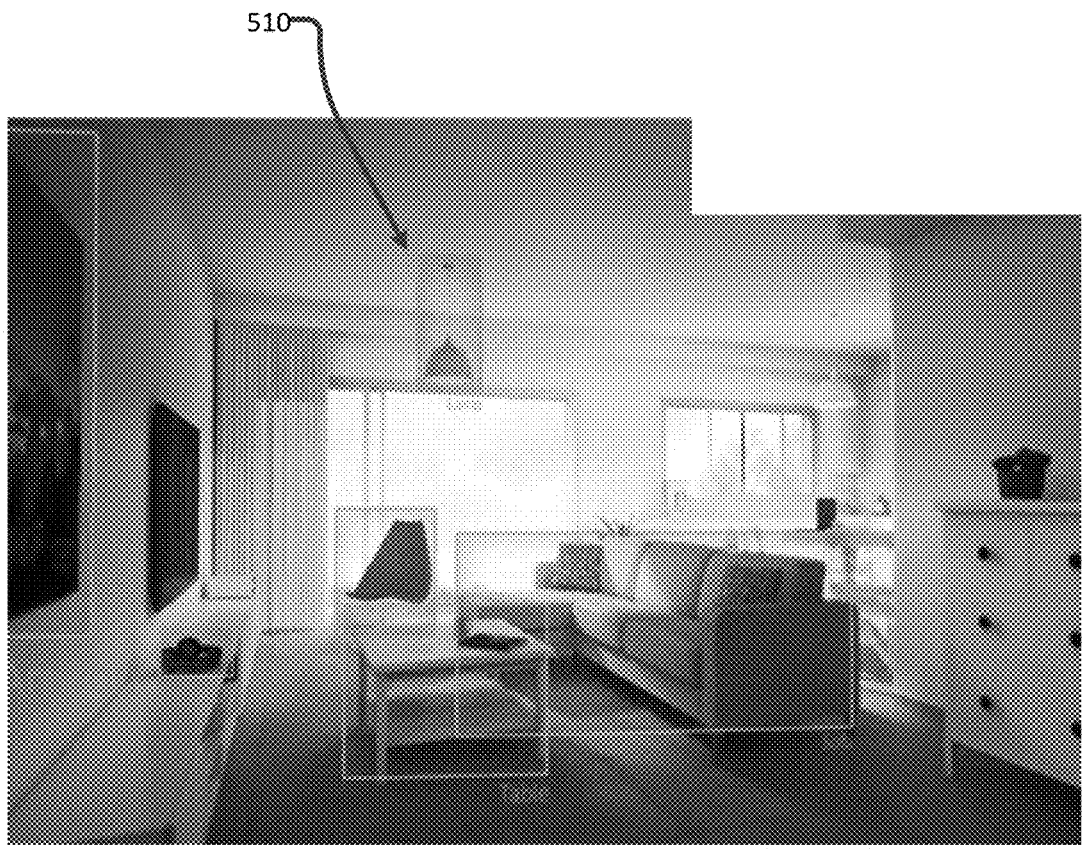
FIG. 5 illustrates an example of 2-Dimensional (2D) bounding boxes, in accordance with certain of the embodiments disclosed herein.

The object detection circuit 408 may be configured to process the RGB image, and in some embodiments the associated depth map as well, to generate a list of any objects of interest recognized in the image. A label may be attached to each of the recognized objects and a 2D bounding box is generated which contains the object. Additionally, a 3D location of the center of the 2D bounding box is computed. FIG. 5 illustrates examples of 2D bounding boxes applied to recognized objects in an RGB image of the scene associated with one camera pose. For example, a boundary box 510 contains the object recognized and labeled as a lamp.

Any suitable object detection technique may be used in to recognize the objects in the scene, and compute their locations in the image including, for example, template matching or classification using a bag-of-words vision model. In some embodiments, deep learning methods, and, in particular, convolutional neural networks are employed by the detection circuit 408. Some neural network methods process an image as input and calculate a probability that a given object is present in the image. Determination of the location of the object in the image may be accomplished using sliding windows that can be applied progressively over the image, cropping smaller regions of the image and applying the network to each window. Other techniques for object location first filter out and reject those windows that are unlikely to contain objects. Importantly, these methods are generally invariant to viewing angles so that the same object, and its corresponding 2D location, can be detected from multiple camera poses.

The object boundary set matching circuit 410 may be configured to find an appropriate existing object boundary set that matches each of the detected objects, if possible. The matching is based on a comparison of the object label and/or the 3D location of the center of the 2D bounding box, between the detected object and each of the existing object boundary sets, if any. A comparison threshold may be used to account for the fact that the estimated center of the 2D bounding boxes corresponding to the same object may vary somewhat when captured from different camera perspectives.

Figure 6:
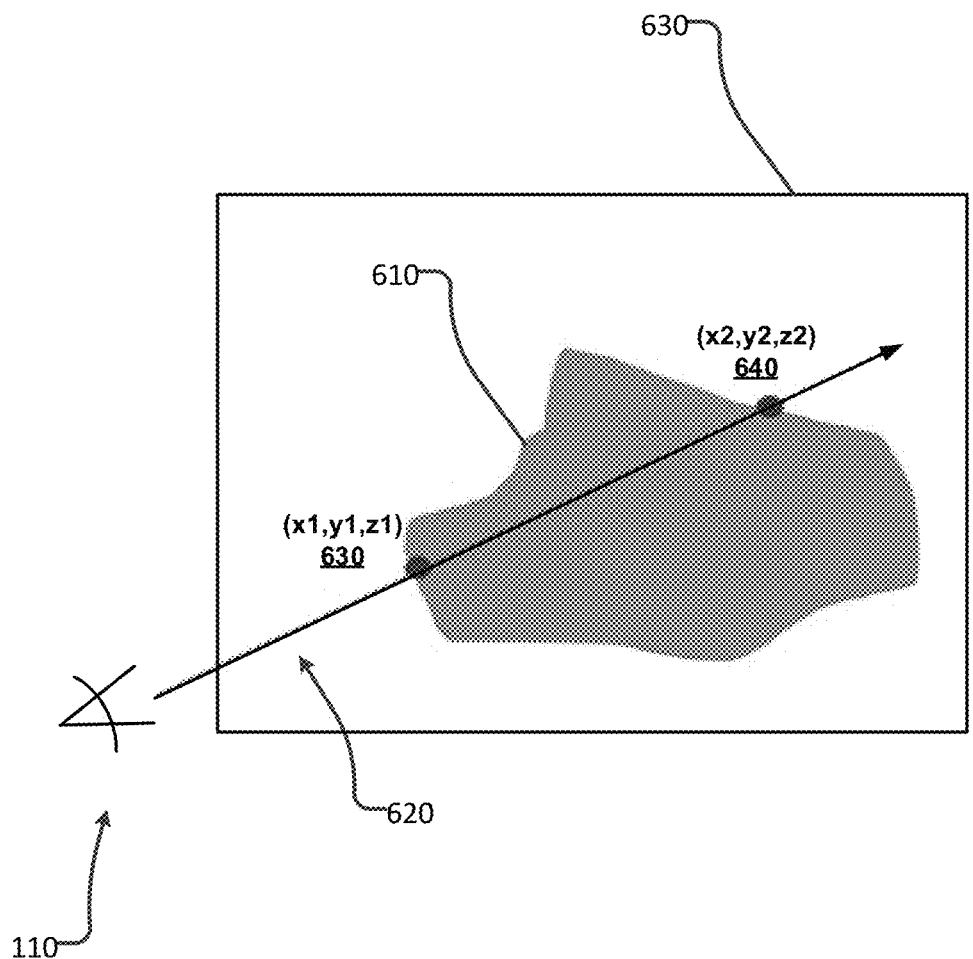
FIG. 6 illustrates an example position and ray associated with pixels in an object boundary set, in accordance with certain of the embodiments disclosed herein.

The object boundary set creation circuit 420 may be configured to create a new object boundary set if a suitable match for the detected object is not found by the object boundary set matching circuit 410. For each unmatched detected object of interest, the 2D bounding box containing the object is scanned to analyze each pixel within the bounding box. For each pixel, the associated 3D position of the 2D pixel is computed, by sampling the associated depth map to obtain the associated depth pixel and projecting that depth pixel to a point in 3D space, at operation 412. A ray is then generated which extends from the camera to the location of the projected point in 3D space at operation 414. The point at this 3D position is included in the object boundary set at operation 416. In order to represent this point in the object boundary set, two 3-element vectors are stored: the 3D (x,y,z) position of the point in the global coordinate system, and the vector representing the ray extending from the camera's position to that point (which is referred to herein as the "camera ray"). FIG. 6 illustrates this in a top-down view, showing the position of the camera 110 in a given pose along with the object 610, which is contained in the 2D bounding box 630. Two example pixel points are also shown, 630 and 640, along with the ray 620 that extends from the camera to the intersection with each pixel point on the boundary of the object. After processing each pixel in the 2D bounding box, the image capture continues, at a new camera pose, until the scan of the scene is complete, operation 418.

When the scanning of the scene is completed, there is a single object boundary set for each object detected in the scene. Each object boundary set contains the aggregate of all points projected from pixels in the 2D bounding box of the object, as captured from multiple camera perspectives. The object boundary set may then be further processed to remove multiple samples of the same point (as seen from different camera perspectives), and to remove incorrect points (not belonging to the object of interest) that were included in the bounding box due, for example to the presence of other objects occluding the view of the object of interest.

Figure 7:
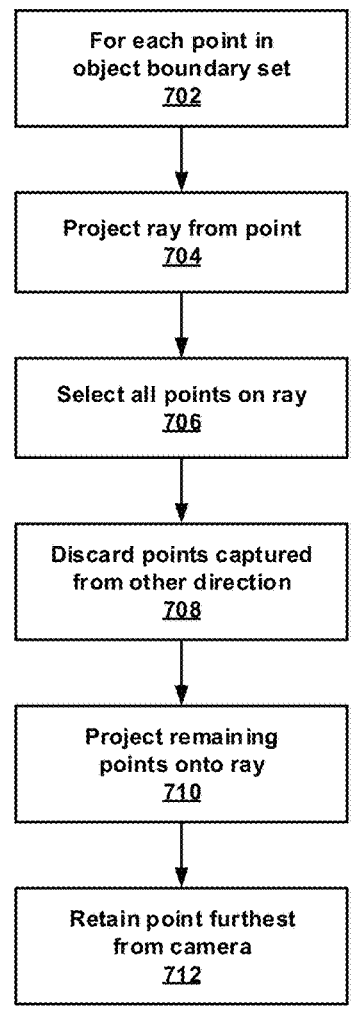
FIG. 7 is a flowchart illustrating a methodology for boundary adjustment, in accordance with certain of the embodiments disclosed herein.

FIG. 7 is a flowchart 700 illustrating a methodology for boundary adjustment, in accordance with certain of the embodiments disclosed herein. Boundary adjustment circuit 106 may be configured to implement this methodology to improve the estimated boundary of the detected objects by removing, from each object boundary set, duplicate pixels and pixels associated with other objects occluding the camera's view of the object of interest. At operation 702, each point P in the object boundary set is considered, and a ray is projected, at operation 704, from the point P in the direction of the camera ray that was previously stored for that point. This ray is referred to herein as the "point ray." Next, at operation 706, all points in the object boundary set are analyzed with respect to the current point P, and any point lying close enough to the point ray (within a given threshold distance) is selected. This set of selected points is referred to as "set A," and the points in set A are considered to be lying on the point ray.

For each of the points in set A, the associated camera ray is extracted and compared to the point ray of the current point P. If the camera ray is opposite in direction to that of the current point ray, then that point, associated with the camera ray, is discarded from set A, at operation 708. To determine whether the camera ray and point ray are in opposite directions, a dot product of the two rays may be computed. The value of this dot product will be negative if the directions of the two rays differ by more than 90 degrees. Thus, if the dot product is negative, the point from set A was likely captured by the camera when viewing the opposite side of the object, and it is ignored for further consideration with respect to point P. In other words, the point discarded from set A is no longer a candidate for removal from the object boundary set since, being on the other side of the object it is not a duplicate of point P.

After each point in set A has been similarly processed, to eliminate points on the opposite side of the object from consideration for removal, the remaining points of set A are assumed to have been captured from the same general view of the object, and only one will be kept in the object boundary set. To decide which point to keep, at operation 710 all remaining points of set A are projected onto the point ray. The point in set A that is furthest away from point P, in the direction of the point ray, is selected, at operation 712, and the rest of the points are discarded from the object boundary set. Any point in set A with a negative position on the point ray (that is, lying in the direction opposite that of the point ray) is also discarded. Note point P may also be discarded from the object boundary set in this stage. By retaining the point which is furthest away from point P (along the direction of P's point ray), point associated with occluding objects will be discarded, since, by definition, the occluding object will be closer to the camera than the object of interest.

Figure 8A:
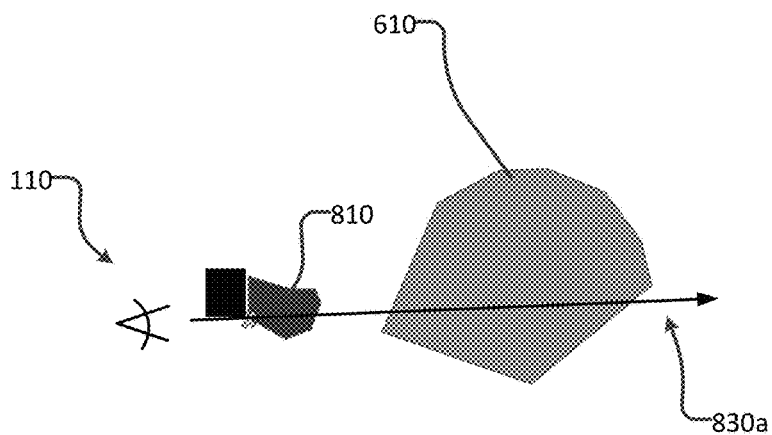
FIGS. 8A, 8B, 8C and 8D illustrate examples of rays used for boundary adjustments, in accordance with certain of the embodiments disclosed herein.
Figure 8B:
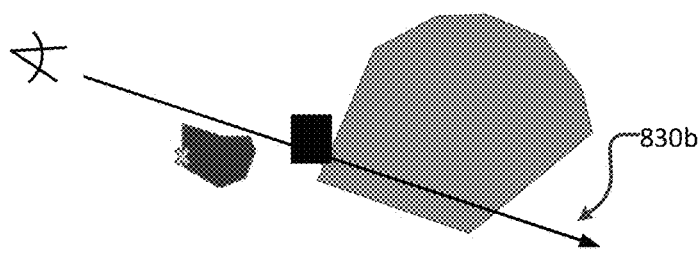
Figure 8C:
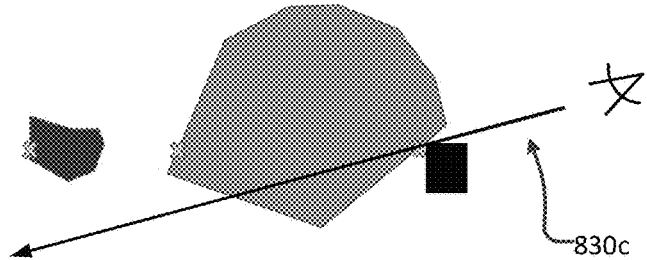
Figure 8D:
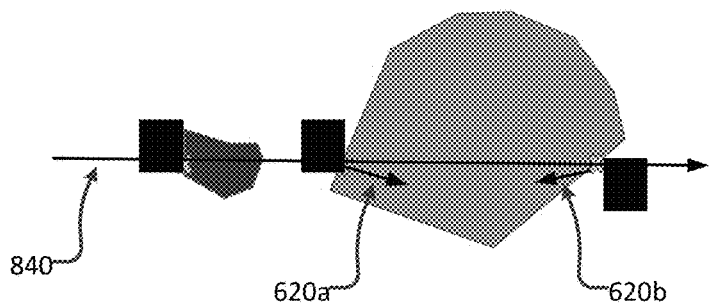

FIGS. 8A, 8B, 8C and 8D further illustrate the use of rays used for boundary adjustments, in accordance with certain of the embodiments disclosed herein. In FIG. 8A, the camera 110 is shown viewing the object of interest 610 from a first perspective or pose described by camera ray 830*a*. An occluding object 810 blocks the camera's view from this perspective and point number 1 may thus be included in the object boundary set. In FIG. 8B, the camera's perspective has changed as the scene is scanned and a new camera ray 830b avoids the occluding object 810. Point number 2 may thus be added to the object boundary set. In FIG. 8C, the camera's perspective has changed again and a new camera ray 830c provides a view of the opposite side of object 610. Point number 3 may thus be added to the object boundary set. In FIG. 8D, the object boundary set adjustment is illustrated with respect to point 1 being chosen as point P, using the terminology established above, with a corresponding point ray 840. Points 2 and 3 are selected form the object boundary set for inclusion in set A because they lie close enough to the point ray 840. Point 3 is eliminated from consideration for removal because its camera ray 620b is in the opposite direction from point ray 840 (because it is on the opposite side of the object with respect to point P). Point 2 is retained in the object boundary set because it is furthest away from point P (and is correctly associated with the object of interest rather than the occluding object). Point 1 is thus removed from the object boundary set since point 2 was retained.

Figure 9:
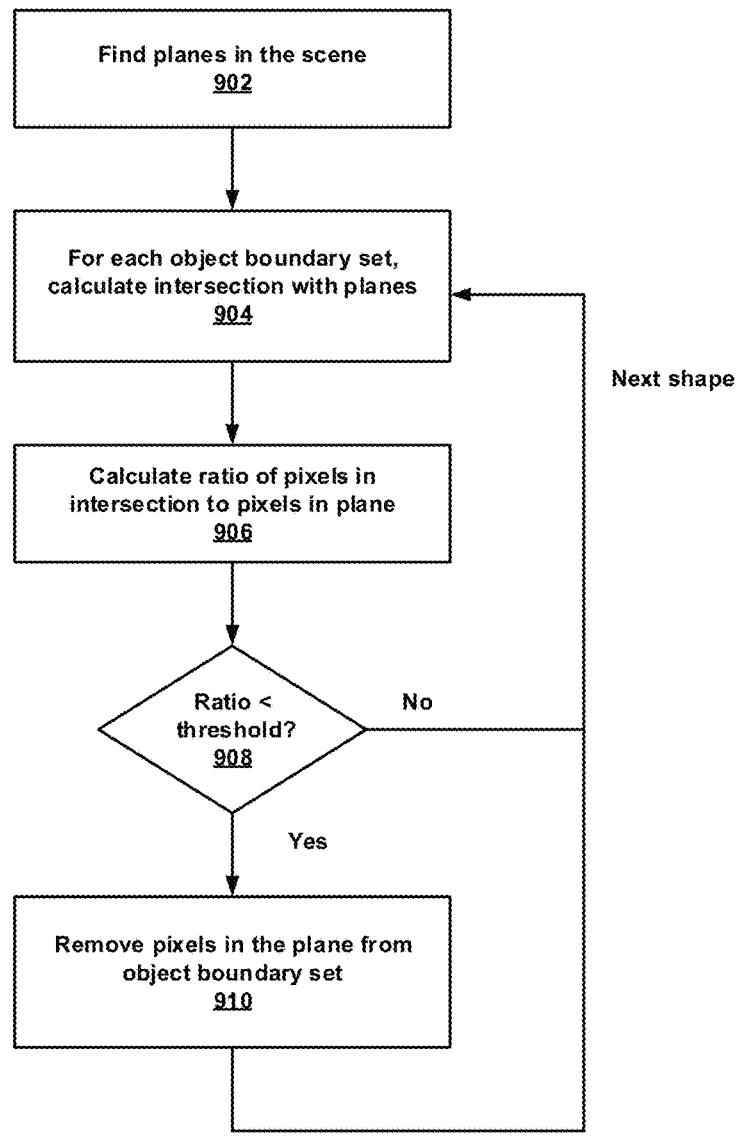
FIG. 9 is a flowchart illustrating a methodology for surface plane removal, in accordance with certain of the embodiments disclosed herein.

FIG. 9 is a flowchart 900 illustrating a methodology for surface plane removal, in accordance with certain of the embodiments disclosed herein. Surface plane removal circuit 108 may be configured to implement this methodology to improve the estimated boundary of the detected objects by removing surface planes upon which the objects may be positioned. It may be common for objects of interest to be resting on a planar surface, such as the floor, table shelves, etc. As a result, it is likely that points from the surface might be erroneously included in the boundary shape. In some embodiments, therefore, a post-processing operation is implemented in which such surface planes are detected, and removed from the 3D segmentation results.

At operation 902, a plane fitting algorithm is applied to the entire scene, in order to detect the planes contained within the scene. One method to accomplish this is to calculate normal vectors to the surfaces by scanning the depth maps and calculating the cross product of differences of neighboring depth pixels. The normal vectors are then clustered into groups based on spatial proximity and the values of the vectors. Next, a plane is fitted to each cluster. Specifically, the equation for the plane, in an x, y, z coordinate system, may be expressed as:

$$ax+by+cz+d=0$$

where the constants a, b, c, d which define the plane may be calculated by a least-squares fit or other known techniques in light of the present disclosure.

Next, at operation 904, the object boundary sets are scanned against the list of planar surfaces, to check for intersections. For each object boundary set, the subset of intersecting points is computed. The size of this intersection relative to the size of the entire planar surface is evaluated at operation 906 and may be expressed as a ratio. If the planar surface extends beyond the boundaries of the object, it is reasonable to assume that it represents a surface supporting the object of interest, and its pixels should be excluded from the object boundary set. In some embodiments, a value of 90% may be used as a threshold for the ratio (operation 908). That is, if the intersection set contains less than 90% of the pixels that are contained by the planar surface, then all the pixels of the planar surface are excluded from the object boundary set, at operation 910. Otherwise, the object boundary set is preserved as is, and the next detected object boundary set is evaluated.

The present disclosure describes a technique for 3D segmentation which, in some embodiments, can be implemented in an interactive manner. For example, the segmentation results may be displayed and updated on display element 112 so that a user operating the camera can continue to refine and improve the quality of the segmentation by moving around the object of interest and continuing to scan it with the depth camera until the segmentation results meet expectations.

Methodology

Figure 10:
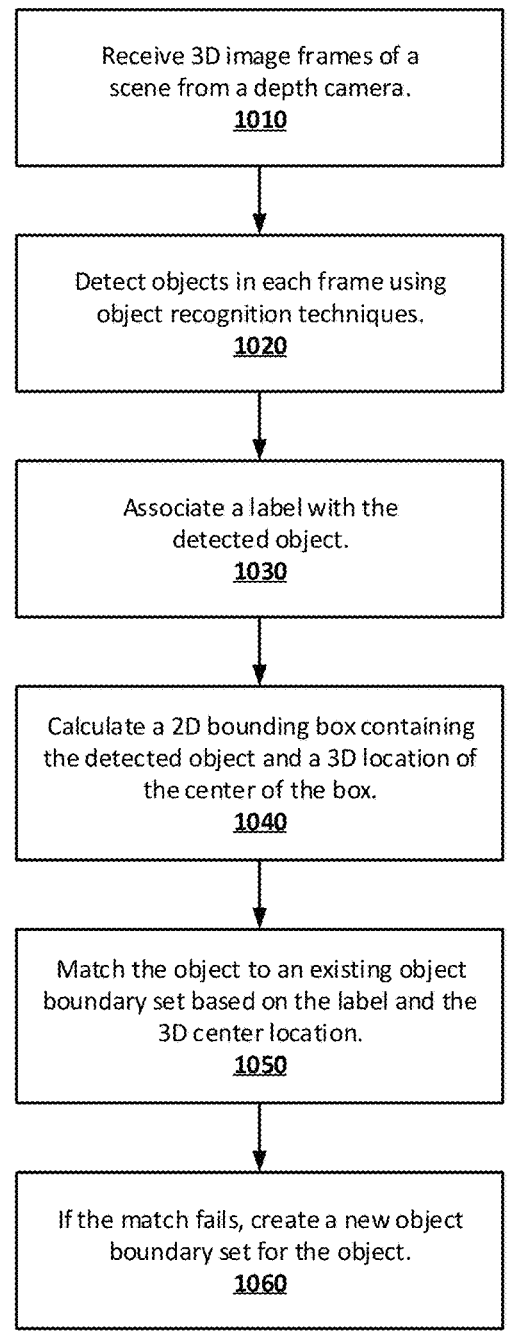
FIG. 10 is a flowchart illustrating a methodology for 3D image segmentation, in accordance with certain of the embodiments disclosed herein.

FIG. 10 is a flowchart illustrating an example method 1000 for segmentation of objects in a 3D image of a scene, in accordance with an embodiment of the present disclosure. As can be seen, example method 1000 includes a number of phases and sub-processes, the sequence of which may vary from one embodiment to another. However, when considered in the aggregate, these phases and sub-processes form a process for 3D image segmentation in accordance with certain of the embodiments disclosed herein. These embodiments can be implemented, for example using the system architecture illustrated in FIG. 1, as described above. However other system architectures can be used in other embodiments, as will be apparent in light of this disclosure. To this end, the correlation of the various functions shown in FIG. 10 to the specific components illustrated in FIG. 1 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 1000. Thus other embodiments may have fewer or more modules and/or sub-modules depending on the granularity of implementation. Numerous variations and alternative configurations will be apparent in light of this disclosure.

As illustrated in FIG. 10, in one embodiment, method 1000 for segmentation of objects in a 3D image of a scene commences by receiving, at operation 1010, a series of 3D image frames, from a depth camera, of a scene containing one or more objects as the camera scans the scene. Each frame may thus provide a new view of the scene from a different perspective or camera pose. Each frame provided by the depth camera may include a color image frame comprising color (RGB) pixels and a depth map frame comprising depth pixels. Next, at operation 1020, one or more objects are detected in each frame using object recognition techniques, and at operation 1030, a label is associated with each detected object.

At operation 1040, a 2D bounding box is calculated which contains the detected object, and a 3D location corresponding to the center of the bounding box is also calculated. At operation 1050, an attempt is made to match the detected object to an existing object boundary set. The matching is based on the label and the 3D center location of the bounding box. At operation 1060, if the match fails, a new object boundary set is created for the detected object. The object boundary set includes 3D positions of the pixels in the 2D bounding box along with an associated vector for each pixel. The vector specifies a ray, or direction, from the position of the depth camera associated with the current camera pose, to the pixel.

Of course, in some embodiments, additional operations may be performed, as previously described in connection with the system. These additional operations may include, for example, adjusting the object boundary set to remove duplicate pixels generated from different poses of the depth camera, based on the distance of the pixels from the camera and further based on the direction of the associated vectors. The adjustment may also remove pixels associated with an occluding object. Further additional operations may include, for example, detecting surface planes upon which the objects may be positioned and removing pixels associated with those planes from the object boundary set.

Example System

Figure 11:
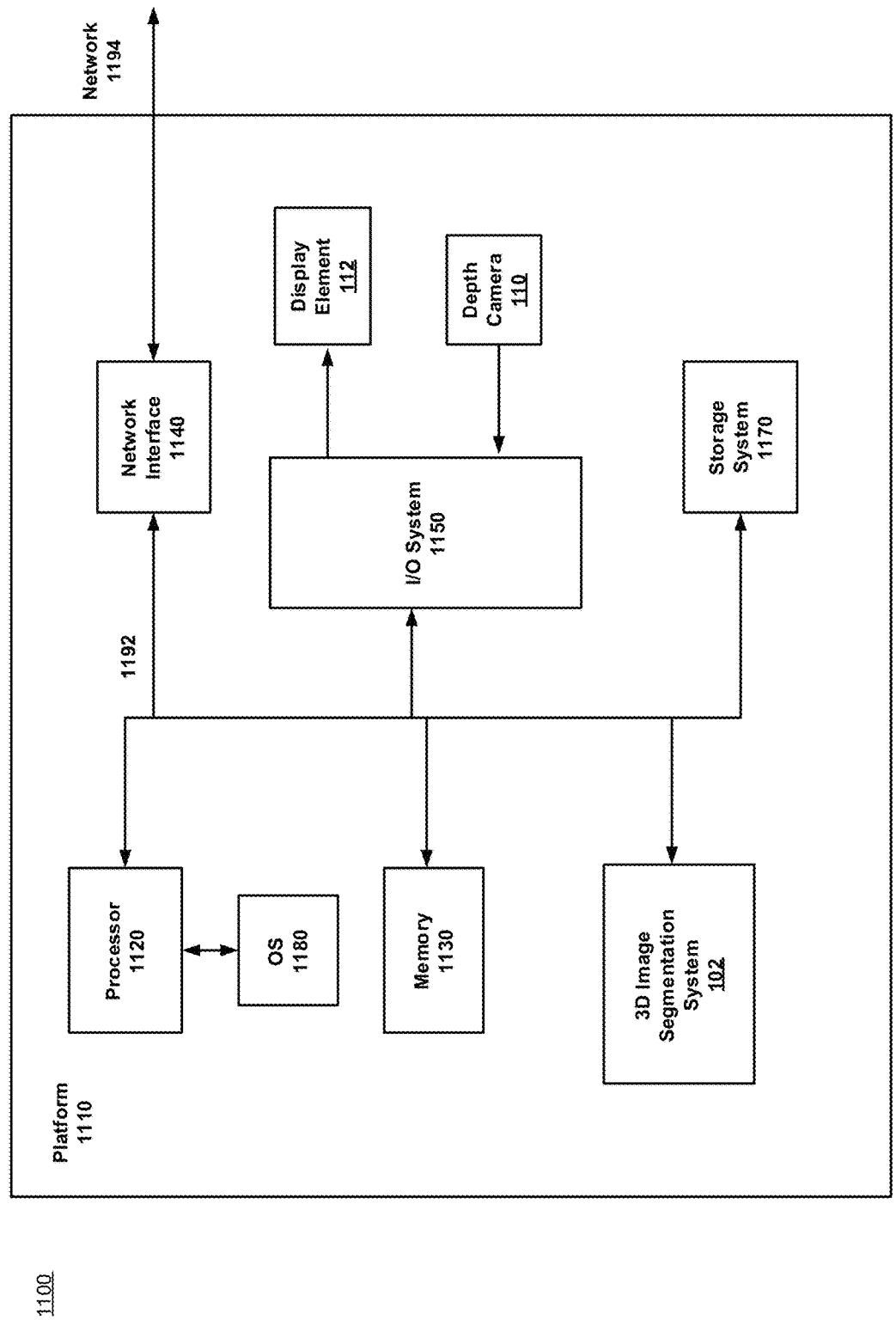
FIG. 11 is a block diagram schematically illustrating a system platform to segment objects from a 3D image, configured in accordance with certain of the embodiments disclosed herein.

FIG. 11 illustrates an example system 1100 that may be configured to segment objects from a 3D image of a scene, for example based on object recognition, as described herein. In some embodiments, system 1100 comprises a platform 1110 which may host, or otherwise be incorporated into a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), and so forth. Any combination of different devices may be used in certain embodiments.

In some embodiments, platform 1110 may comprise any combination of a processor 1120, a memory 1130, a 3D image segmentation system 102, a depth camera 106, a network interface 1140, an input/output (I/O) system 1150, a display element 112, and a storage system 1170. As can be further seen, a bus and/or interconnect 1192 is also provided to allow for communication between the various components listed above and/or other components not shown. Platform 1110 can be coupled to a network 1194 through network interface 1140 to allow for communications with other computing devices, platforms or resources. Other componentry and functionality not reflected in the block diagram of FIG. 11 will be apparent in light of this disclosure, and it will be appreciated that other embodiments are not limited to any particular hardware configuration.

Processor 1120 can be any suitable processor, and may include one or more coprocessors or controllers, such as an audio processor or a graphics processing unit, to assist in control and processing operations associated with system 1100. In some embodiments, the processor 1120 may be implemented as any number of processor cores. The processor (or processor cores) may be any type or combination of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1120 may be implemented as a complex instruction set computer (CISC) or a reduced instruction set computer (RISC) processor. In some embodiments, processor 1120 may be configured as an x86 instruction set compatible processor.

Memory 1130 can be implemented using any suitable type of digital storage including, for example, flash memory and/or random access memory (RAM). In some embodiments, the memory 1130 may include various layers of memory hierarchy and/or memory caches as are known to those of skill in the art. Memory 1130 may be implemented as a volatile memory device such as, but not limited to, a RAM, dynamic RAM (DRAM), or static RAM (SRAM) device. Storage system 1170 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1170 may comprise technology to increase the storage performance enhanced protection for valuable digital media when multiple hard drives are included.

Processor 1120 may be configured to execute an Operating System (OS) 1180 which may comprise any suitable operating system, such as Google Android (Google Inc., Mountain View, Calif.), Microsoft Windows (Microsoft Corp., Redmond, WA), Linux, or Apple OS X (Apple Inc., Cupertino, Calif.) and/or various real-time operating systems. As will be appreciated in light of this disclosure, the techniques provided herein can be implemented without regard to the particular operating system provided in conjunction with system 1100, and therefore may also be implemented using any suitable existing or subsequently-developed platform.

Network interface module 1140 can be any appropriate network chip or chipset which allows for wired and/or wireless connection between other components of computer system 1100 and/or network 1194, thereby enabling system 1100 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1150 may be configured to interface between various I/O devices and other components of computer system 1100. I/O devices may include, but not be limited to, a display element 112, depth camera 106, and other devices not shown such as a keyboard, mouse, speaker, microphone, etc.

I/O system 1150 may include a graphics subsystem configured to perform processing of images for display element 112. Graphics subsystem may be a graphics processing unit or a visual processing unit (VPU), for example. An analog or digital interface may be used to communicatively couple graphics subsystem and display element 112. For example, the interface may be any of a high definition multimedia interface (HDMI), DisplayPort, wireless HDMI, and/or any other suitable interface using wireless high definition compliant techniques. In some embodiment, the graphics subsystem could be integrated into processor 1120 or any chipset of platform 1110. In some embodiments, display element 112 may comprise any television type monitor or display, including liquid crystal displays (LCDs) and light emitting diode displays (LEDs). Display element 112 may comprise, for example, a computer display screen, touchscreen display, video monitor, television-like device, and/or a television. Display element 112 may be digital and/or analog. Under the control of the OS 1180 (or one or more software applications), platform 1110 may display processed images on display element 112. The images may be provided by 3D image segmentation system 102, depth camera 106, or other sources. Camera 106 may be configured to provide color (RGB) and depth images or scans of the scene from which a 3D image segmentation of the object may be generated.

It will be appreciated that in some embodiments, the various components of the system 1100 may be combined or integrated in a system-on-a-chip (SoC) architecture. In some embodiments, the components may be hardware components, firmware components, software components or any suitable combination of hardware, firmware or software.

3D image segmentation system 102 is configured to segment objects from a 3D image of a scene. The segmentation may employ object recognition techniques and may include scanning of the scene by a depth camera to collect 3D images from a number of perspectives or camera poses. 3D image segmentation system 102 may include any or all of the components illustrated in FIG. 1 and described above. 3D image segmentation system 102 can be implemented or otherwise used in conjunction with a variety of suitable software and/or hardware that is coupled to or that otherwise forms a part of system 1100. 3D image segmentation system 102 can additionally or alternatively be implemented or otherwise used in conjunction with user I/O devices that are capable of providing information to, and receiving information and commands from, a user. These I/O devices may include display element 112, a textual input device such as a keyboard, and a pointer-based input device such as a mouse. Other input/output devices that may be used in other embodiments include a touchscreen, a touchpad, a speaker, and/or a microphone. Still other input/output devices can be used in other embodiments.

In some embodiments 3D image segmentation system 102 may be installed local to system 1100, as shown in the example embodiment of FIG. 11. Alternatively, system 1100 can be implemented in a client-server arrangement (or local and cloud based arrangement) wherein at least some functionality associated with 3D image segmentation system 102 is provided to system 1100 using an applet, such as a JavaScript applet, or other downloadable module. Such a remotely accessible module or sub-module can be provisioned in real-time in response to a request from a client computing system for access to a given server having resources that are of interest to the user of the client computing system. In such embodiments the server can be local to network 1194 or remotely coupled to network 1194 by one or more other networks and/or communication channels. In some cases access to resources on a given network or computing system may require credentials such as usernames, passwords, and/or compliance with any other suitable security mechanism.

In various embodiments, system 1100 may be implemented as a wireless system, a wired system, or a combination of both. When implemented as a wireless system, system 1100 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 1100 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example in one embodiment at least one non-transitory computer readable storage medium has instructions encoded thereon that, when executed by one or more processors, cause one or more of the methodologies for generating 3D object image variations, disclosed herein, to be implemented. The instructions can be encoded using a suitable programming language, such as C, C++, object oriented C, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, 3D image segmentation system 102 may operate by leveraging processing resources provided by a remote computer system accessible via network 1194. In other embodiments the functionalities disclosed herein can be incorporated into other software applications, such as image management applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 1100 may comprise additional, fewer, or alternative subcomponents as compared to those included in the example embodiment of FIG. 11.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system onchip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for 3-Dimensional (3D) segmentation of objects. The method comprises receiving a plurality of 3D image frames of a scene, wherein each of the 3D image frames is associated with a pose of a depth camera that generated the 3D image frames; detecting one or more of the objects in each of the 3D image frames based on object recognition; associating a label with the detected object; calculating a 2-Dimensional (2D) bounding box containing the detected object, and a 3D location of the center of the 2D bounding box; matching the detected object to an existing object boundary set created from a previously received 3D image frame, the matching based on the label and the 3D location of the center of the 2D bounding box; and in response to a failure of the matching, creating a new object boundary set associated with the detected object.

Example 2 includes the subject matter of Example 1, wherein the object boundary set comprises 3D positions of pixels in the 2D bounding box corresponding to the boundary of the object, and further comprises vectors associated with the pixels, the vectors specifying a ray from the position of the depth camera associated with the corresponding pose, to each of the pixels.

Example 3 includes the subject matter of Examples 1 and 2, further comprising adjusting the object boundary set to remove duplicate pixels generated from different poses of the depth camera, the removal based on the distance of the pixels from the camera and further based on the direction of the associated vectors.

Example 4 includes the subject matter of Examples 1-3, further comprising adjusting the object boundary set to remove pixels associated with an occluding object.

Example 5 includes the subject matter of Examples 1-4, further comprising: detecting surface planes in the scene; calculating an intersection of the detected surface plane with the object boundary set; calculating a ratio of pixels in the intersection to pixels in the detected surface plane; and if the ratio is less than a threshold value, removing the pixels in the detected surface plane from the object boundary set.

Example 6 includes the subject matter of Examples 1-5, wherein the detecting of surface planes further comprises: calculating normal vectors as the cross product of the difference of neighboring depth pixels of the 3D image frame; clustering the normal vectors based on their value and spatial proximity; and fitting a plane to each cluster based on a least-squares fit.

Example 7 includes the subject matter of Examples 1-6, wherein each pose of the depth camera is estimated by one of: using a transformation of the camera based on an Iterative Closest Point (ICP) matching operation performed on depth pixels of the 3D image frames; or using a Simultaneous Localization and Mapping (SLAM) operation performed on Red-Green-Blue (RGB) pixels of the 3D image frames; or based on data provided by inertial sensors in the depth camera.

Example 8 includes the subject matter of Examples 1-7, wherein the object recognition is based on at least one of template matching, classification using a bag-of-words vision model, and classification using a convolutional neural network.

Example 9 is a system for 3-Dimensional (3D) segmentation of objects, the system comprising: an object detection circuit to: detect one or more of the objects in each of a plurality of 3D image frames of a scene based on object recognition, wherein the plurality of 3D image frames are captured by a depth camera, each of the 3D image frames being associated with a pose of the depth camera; associate a label with the detected object; and calculate a 2-Dimensional (2D) bounding box containing the detected object and a 3D location of the center of the 2D bounding box; an object boundary set matching circuit to match the detected object to an existing object boundary set created from a previously received 3D image frame, the matching based on the label and the 3D location of the center of the 2D bounding box; and an object boundary set creation circuit to create, in response to a failure of the matching, a new object boundary set associated with the detected object.

Example 10 includes the subject matter of Example 9, wherein the object boundary set comprises 3D positions of pixels in the 2D bounding box corresponding to the boundary of the object, and further comprises vectors associated with the pixels, the vectors specifying a ray from the position of the depth camera associated with the corresponding pose, to each of the pixels.

Example 11 includes the subject matter of Examples 9 and 10, further comprising a boundary adjustment circuit to adjust the object boundary set to remove duplicate pixels generated from different poses of the depth camera, the removal based on the distance of the pixels from the camera and further based on the direction of the associated vectors.

Example 12 includes the subject matter of Examples 9-11, wherein the boundary adjustment circuit is further to adjust the object boundary set to remove pixels associated with an occluding object.

Example 13 includes the subject matter of Examples 9-12, further comprising a surface plane removal circuit to: detect surface planes in the scene; calculate an intersection of the detected surface plane with the object boundary set; calculate a ratio of pixels in the intersection to pixels in the detected surface plane; and if the ratio is less than a threshold value, remove the pixels in the detected surface plane from the object boundary set.

Example 14 includes the subject matter of Examples 9-13, wherein the surface plane removal circuit is further to: calculate normal vectors as the cross product of the difference of neighboring depth pixels of the 3D image frame; cluster the normal vectors based on their value and spatial proximity; and fit a plane to each cluster, based on a least-squares fit, to detect the surface planes in the scene.

Example 15 includes the subject matter of Examples 9-14, wherein each pose of the depth camera is estimated by one of: using a transformation of the camera based on an Iterative Closest Point (ICP) matching operation performed on depth pixels of the 3D image frames; or using a Simultaneous Localization and Mapping (SLAM) operation performed on Red-Green-Blue (RGB) pixels of the 3D image frames; or based on data provided by inertial sensors in the depth camera.

Example 16 includes the subject matter of Examples 9-15, wherein the object recognition is based on at least one of template matching, classification using a bag-of-words vision model, and classification using a convolutional neural network.

Example 17 includes the subject matter of Examples 9-16, further comprising the depth camera.

Example 18 is a system-on-chip or chip set comprising the system of claim 9-17.

Example 19 is at least one non-transitory computer readable storage medium having instructions encoded thereon that, when executed by one or more processors, result in the following operations for 3-Dimensional (3D) segmentation of objects, the operations comprising: receiving, a plurality of 3D image frames of a scene, wherein each of the 3D image frames is associated with a pose of a depth camera that generated the 3D image frames; detecting one or more of the objects in each of the 3D image frames based on object recognition; associating a label with the detected object; calculating a 2-Dimensional (2D) bounding box containing the detected object, and a 3D location of the center of the 2D bounding box; matching the detected object to an existing object boundary set created from a previously received 3D image frame, the matching based on the label and the 3D location of the center of the 2D bounding box;

and creating in response to a failure of the matching, a new object boundary set associated with the detected object.

Example 20 includes the subject matter of Example 19, wherein the object boundary set comprises 3D positions of pixels in the 2D bounding box corresponding to the boundary of the object, and further comprises vectors associated with the pixels, the vectors specifying a ray from the position of the depth camera associated with the corresponding pose, to each of the pixels.

Example 21 includes the subject matter of Examples 19 and 20, further comprising adjusting the object boundary set to remove duplicate pixels generated from different poses of the depth camera, the removal based on the distance of the pixels from the camera and further based on the direction of the associated vectors.

Example 22 includes the subject matter of Examples 19-21, further comprising adjusting the object boundary set to remove pixels associated with an occluding object.

Example 23 includes the subject matter of Examples 19-22, further comprising: detecting surface planes in the scene; calculating an intersection of the detected surface plane with the object boundary set; calculating a ratio of pixels in the intersection to pixels in the detected surface plane; and if the ratio is less than a threshold value, removing the pixels in the detected surface plane from the object boundary set.

Example 24 includes the subject matter of Examples 19-23, wherein the detecting of surface planes further comprises: calculating normal vectors as the cross product of the difference of neighboring depth pixels of the 3D image frame; clustering the normal vectors based on their value and spatial proximity; and fitting a plane to each cluster based on a least-squares fit.

Example 25 includes the subject matter of Examples 19-24, wherein each pose of the depth camera is estimated by one of: using a transformation of the camera based on an Iterative Closest Point (ICP) matching operation performed on depth pixels of the 3D image frames; or using a Simultaneous Localization and Mapping (SLAM) operation performed on Red-Green-Blue (RGB) pixels of the 3D image frames; or based on data provided by inertial sensors in the depth camera.

Example 26 includes the subject matter of Examples 19-25, wherein the object recognition is based on at least one of template matching, classification using a bag-of-words vision model, and classification using a convolutional neural network.

Example 27 is a system for 3-Dimensional (3D) segmentation of objects, the system comprising: means for receiving a plurality of 3D image frames of a scene, wherein each of the 3D image frames is associated with a pose of a depth camera that generated the 3D image frames; means for detecting one or more of the objects in each of the 3D image frames based on object recognition; means for associating a label with the detected object; means for calculating a 2-Dimensional (2D) bounding box containing the detected object, and a 3D location of the center of the 2D bounding box; means for matching the detected object to an existing object boundary set created from a previously received 3D image frame, the matching based on the label and the 3D location of the center of the 2D bounding box; and means for, in response to a failure of the matching, creating a new object boundary set associated with the detected object.

Example 28 includes the subject matter of Example 27, wherein the object boundary set comprises 3D positions of pixels in the 2D bounding box corresponding to the boundary of the object, and further comprises vectors associated with the pixels, the vectors specifying a ray from the position of the depth camera associated with the corresponding pose, to each of the pixels.

Example 29 includes the subject matter of Examples 27 and 28, further comprising means for adjusting the object boundary set to remove duplicate pixels generated from different poses of the depth camera, the removal based on the distance of the pixels from the camera and further based on the direction of the associated vectors.

Example 30 includes the subject matter of Examples 27-29, further comprising means for adjusting the object boundary set to remove pixels associated with an occluding object.

Example 31 includes the subject matter of Examples 27-30, further comprising: means for detecting surface planes in the scene; means for calculating an intersection of the detected surface plane with the object boundary set; means for calculating a ratio of pixels in the intersection to pixels in the detected surface plane; and means for, if the ratio is less than a threshold value, removing the pixels in the detected surface plane from the object boundary set.

Example 32 includes the subject matter of Examples 27-31, wherein the detecting of surface planes further comprises: means for calculating normal vectors as the cross product of the difference of neighboring depth pixels of the 3D image frame; means for clustering the normal vectors based on their value and spatial proximity; and means for fitting a plane to each cluster based on a least-squares fit.

Example 33 includes the subject matter of Examples 27-32, wherein each pose of the depth camera is estimated by one of: using a transformation of the camera based on an Iterative Closest Point (ICP) matching operation performed on depth pixels of the 3D image frames; or using a Simultaneous Localization and Mapping (SLAM) operation performed on Red-Green-Blue (RGB) pixels of the 3D image frames; or based on data provided by inertial sensors in the depth camera.

Example 34 includes the subject matter of Examples 27-33, wherein the object recognition is based on at least one of template matching, classification using a bag-of-words vision model, and classification using a convolutional neural network.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for 3-Dimensional (3D) segmentation of objects, the method comprising:

receiving, by a processor, a plurality of 3D image frames of a scene, wherein each of the 3D image frames is associated with a pose of a depth camera that generated the 3D image frames;

detecting, by the processor, an object in each of the 3D image frames based on object recognition;

associating, by the processor, a label with the detected object, the label generated from the object recognition;

calculating, by the processor, a 2-Dimensional (2D) bounding box containing the detected object, and a 3D location of the center of the 2D bounding box;

matching, by the processor, the detected object to an existing object boundary set created from a previously received 3D image frame, the matching based on the label and the 3D location of the center of the 2D bounding box; and in response to a failure of the matching, creating, by the processor, a new object boundary set associated with the detected object.

2. The method of claim 1, wherein the object boundary set comprises 3D positions of pixels in the 2D bounding box corresponding to the boundary of the object, and further comprises vectors associated with the pixels, the vectors specifying a ray from the position of the depth camera associated with the corresponding pose, to each of the pixels.

3. The method of claim 2, further comprising adjusting the object boundary set to remove duplicate pixels generated from different poses of the depth camera, the removal based on the distance of the pixels from the camera and further based on the direction of the associated vectors.

4. The method of claim 3, further comprising adjusting the object boundary set to remove pixels associated with an occluding object.

5. The method of claim 1, further comprising:
detecting surface planes in the scene;
calculating an intersection of the detected surface plane with the object boundary set;
calculating a ratio of pixels in the intersection to pixels in the detected surface plane; and
if the ratio is less than a threshold value, removing the pixels in the detected surface plane from the object boundary set.

6. The method of claim 5, wherein the detecting of surface planes further comprises:
calculating normal vectors as the cross product of the difference of neighboring depth pixels of the 3D image frame;
clustering the normal vectors based on their value and spatial proximity; and
fitting a plane to each cluster based on a least-squares fit.

7. The method of claim 1, wherein each pose of the depth camera is estimated by one of: using a transformation of the camera based on an Iterative Closest Point (ICP) matching operation performed on depth pixels of the 3D image frames; or using a Simultaneous Localization and Mapping (SLAM) operation performed on Red-Green-Blue (RGB) pixels of the 3D image frames; or based on data provided by inertial sensors in the depth camera.

8. The method of claim 1, wherein the object recognition is based on at least one of template matching, classification using a bag-of-words vision model, and classification using a convolutional neural network.

9. A system for 3-Dimensional (3D) segmentation of objects, the system comprising:
an object detection circuit to: detect an object in each of a plurality of 3D image frames of a scene based on object recognition, wherein the plurality of 3D image frames are captured by a depth camera, each of the 3D image frames being associated with a pose of the depth camera; associate a label with the detected object, the label generated by the object detection circuit based on the object recognition; and calculate a 2-Dimensional (2D) bounding box containing the detected object and a 3D location of the center of the 2D bounding box;
an object boundary set matching circuit to match the detected object to an existing object boundary set created from a previously received 3D image frame, the matching based on the label and the 3D location of the center of the 2D bounding box; and
an object boundary set creation circuit to create, in response to a failure of the matching, a new object boundary set associated with the detected object.

10. The system of claim 9, wherein the object boundary set comprises 3D positions of pixels in the 2D bounding box corresponding to the boundary of the object, and further comprises vectors associated with the pixels, the vectors specifying a ray from the position of the depth camera associated with the corresponding pose, to each of the pixels.

11. The system of claim 10, further comprising a boundary adjustment circuit to adjust the object boundary set to remove duplicate pixels generated from different poses of the depth camera, the removal based on the distance of the pixels from the camera and further based on the direction of the associated vectors.

12. The system of claim 11, wherein the boundary adjustment circuit is further to adjust the object boundary set to remove pixels associated with an occluding object.

13. The system of claim 9, further comprising a surface plane removal circuit to:
detect surface planes in the scene;
calculate an intersection of the detected surface plane with the object boundary set;
calculate a ratio of pixels in the intersection to pixels in the detected surface plane; and
if the ratio is less than a threshold value, remove the pixels in the detected surface plane from the object boundary set.

14. The system of claim 13, wherein the surface plane removal circuit is further to:
calculate normal vectors as the cross product of the difference of neighboring depth pixels of the 3D image frame;
cluster the normal vectors based on their value and spatial proximity; and
fit a plane to each cluster, based on a least-squares fit, to detect the surface planes in the scene.

15. The system of claim 9, wherein each pose of the depth camera is estimated by one of: using a transformation of the camera based on an Iterative Closest Point (ICP) matching operation performed on depth pixels of the 3D image frames; or using a Simultaneous Localization and Mapping (SLAM) operation performed on Red-Green-Blue (RGB) pixels of the 3D image frames; or based on data provided by inertial sensors in the depth camera.

16. The system of claim 9, wherein the object recognition is based on at least one of template matching, classification using a bag-of-words vision model, and classification using a convolutional neural network.

17. The system of claim 9, further comprising the depth camera.

18. A system-on-chip or chip set comprising the system of claim 9.

19. At least one non-transitory computer readable storage medium having instructions encoded thereon that, when executed by one or more processors, result in the following operations for 3-Dimensional (3D) segmentation of objects, the operations comprising:
- receiving, a plurality of 3D image frames of a scene, wherein each of the 3D image frames is associated with a pose of a depth camera that generated the 3D image frames;
- detecting an object in each of the 3D image frames based on object recognition;
- associating a label with the detected object, the label derived from the object recognition;
- calculating a 2-Dimensional (2D) bounding box containing the detected object, and a 3D location of the center of the 2D bounding box;
- matching the detected object to an existing object boundary set created from a previously received 3D image frame, the matching based on the label and the 3D location of the center of the 2D bounding box; and
- creating in response to a failure of the matching, a new object boundary set associated with the detected object.

20. The computer readable storage medium of claim 19, wherein the object boundary set comprises 3D positions of pixels in the 2D bounding box corresponding to the boundary of the object, and further comprises vectors associated with the pixels, the vectors specifying a ray from the position of the depth camera associated with the corresponding pose, to each of the pixels.

21. The computer readable storage medium of claim 20, further comprising adjusting the object boundary set to remove duplicate pixels generated from different poses of the depth camera, the removal based on the distance of the pixels from the camera and further based on the direction of the associated vectors.

22. The computer readable storage medium of claim 21, further comprising adjusting the object boundary set to remove pixels associated with an occluding object.

23. The computer readable storage medium of 19, further comprising:
- detecting surface planes in the scene;
- calculating an intersection of the detected surface plane with the object boundary set;
- calculating a ratio of pixels in the intersection to pixels in the detected surface plane; and
- if the ratio is less than a threshold value, removing the pixels in the detected surface plane from the object boundary set.

24. The computer readable storage medium of claim 23, wherein the detecting of surface planes further comprises:
- calculating normal vectors as the cross product of the difference of neighboring depth pixels of the 3D image frame;
- clustering the normal vectors based on their value and spatial proximity; and
- fitting a plane to each cluster based on a least-squares fit.

25. The computer readable storage medium of claim 19, wherein each pose of the depth camera is estimated by one of: using a transformation of the camera based on an Iterative Closest Point (ICP) matching operation performed on depth pixels of the 3D image frames; or using a Simultaneous Localization and Mapping (SLAM) operation performed on Red-Green-Blue (RGB) pixels of the 3D image frames; or based on data provided by inertial sensors in the depth camera, and wherein the object recognition is based on at least one of template matching, classification using a bag-of-words vision model, and classification using a convolutional neural network.

* * * * *